US009582712B2

(12) United States Patent
Park et al.

(10) Patent No.: US 9,582,712 B2
(45) Date of Patent: Feb. 28, 2017

(54) DIGITAL IMAGE PROCESSING APPARATUS AND SYSTEM AND CONTROL METHOD THEREOF

(71) Applicant: LG ELECTRONICS INC., Seoul (KR)

(72) Inventors: Sihwa Park, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 14/464,256

(22) Filed: Aug. 20, 2014

(65) Prior Publication Data

US 2016/0012284 A1     Jan. 14, 2016

(30) Foreign Application Priority Data

Jul. 8, 2014   (KR) .................. 10-2014-0084957

(51) Int. Cl.
*G06K 9/00* (2006.01)
*G06F 3/01* (2006.01)
*G06K 9/20* (2006.01)

(52) U.S. Cl.
CPC ......... *G06K 9/00402* (2013.01); *G06F 3/01* (2013.01); *G06K 9/00671* (2013.01); *G06K 9/2081* (2013.01)

(58) Field of Classification Search
CPC .......... G06K 9/00402; G06K 9/00671; G06K 9/2081; G06F 3/01
See application file for complete search history.

(56) References Cited

U.S. PATENT DOCUMENTS

| 8,358,320 | B2 | 1/2013 | Zhou et al. |
| 8,502,780 | B1 * | 8/2013 | Park .................. G06F 3/04886 345/165 |
| 8,558,872 | B1 * | 10/2013 | Cho .................. H04N 13/00 348/43 |
| 8,878,750 | B1 * | 11/2014 | Park .................. G06K 9/00221 345/156 |
| 2006/0282575 | A1 | 12/2006 | Schultz et al. |
| 2007/0089049 | A1 | 4/2007 | Gormish et al. |

(Continued)

*Primary Examiner* — Gregory M Desire
(74) *Attorney, Agent, or Firm* — Birch, Stewart, Kolasch & Birch, LLP

(57) ABSTRACT

A digital image processing apparatus, system and a control method thereof are disclosed. The digital image processing apparatus includes an image sensor unit to sense hand-drawn information, a display unit to display complete information including the sensed information as partial information, a communication unit to transmit selected complete information among the complete information to a server and a controller. The controller controls the display unit so as to display the complete information by searching for the complete information, and also controls the display unit so as to display the selected complete information when one of the retrieved complete information is selected. The controller senses a hand-drawn marker and, when the sensed marker is a sharing attribute marker, links the sharing attribute marker with the selected complete information and controls the communication unit so as to transmit the selected complete information along with the sharing attribute marker.

20 Claims, 13 Drawing Sheets

(56) References Cited

U.S. PATENT DOCUMENTS

| | | | |
|---|---|---|---|
| 2011/0162056 A1* | 6/2011 | Takahashi | G06F 21/10 |
| | | | 726/7 |
| 2011/0289147 A1 | 11/2011 | Styles et al. | |
| 2012/0110007 A1 | 5/2012 | Cohen et al. | |
| 2012/0249741 A1* | 10/2012 | Maciocci | G06F 3/011 |
| | | | 348/46 |
| 2012/0297294 A1 | 11/2012 | Scott et al. | |
| 2013/0293468 A1* | 11/2013 | Perez | G06F 3/033 |
| | | | 345/158 |
| 2013/0297308 A1 | 11/2013 | Koo et al. | |
| 2014/0101579 A1* | 4/2014 | Kim | G06F 3/0486 |
| | | | 715/761 |
| 2014/0111838 A1* | 4/2014 | Han | G02B 27/017 |
| | | | 359/13 |
| 2014/0139439 A1* | 5/2014 | Park | G06F 3/04886 |
| | | | 345/169 |
| 2014/0156262 A1 | 6/2014 | Yuen et al. | |
| 2014/0344448 A1* | 11/2014 | Ha | H04L 43/0876 |
| | | | 709/224 |
| 2016/0012284 A1* | 1/2016 | Park | G06K 9/00402 |
| | | | 382/189 |

* cited by examiner

FIG. 9
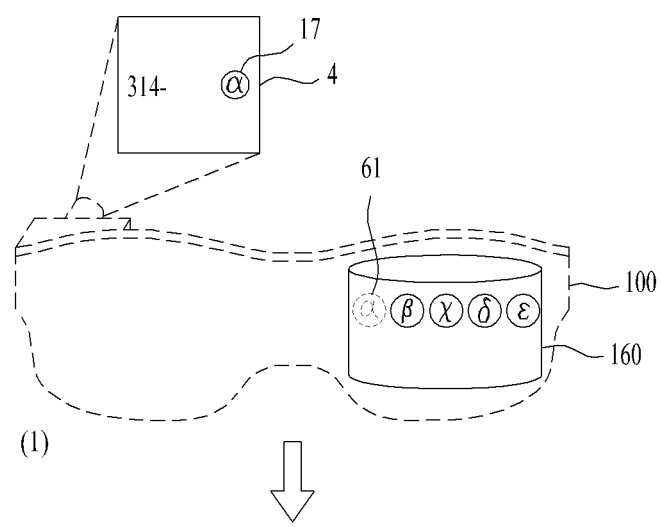
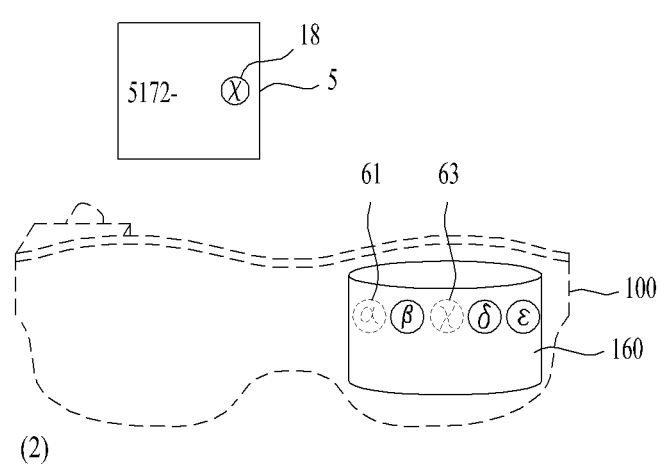

FIG. 10
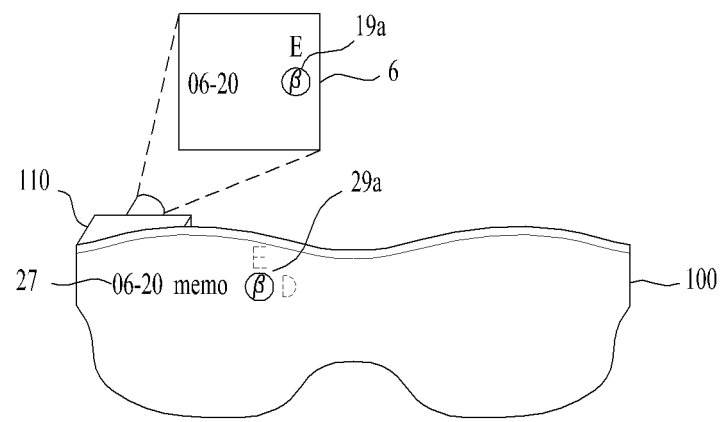
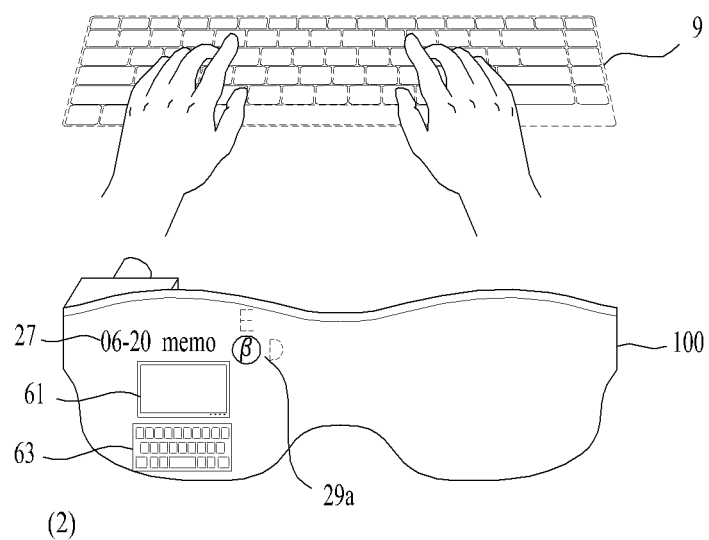

FIG. 11
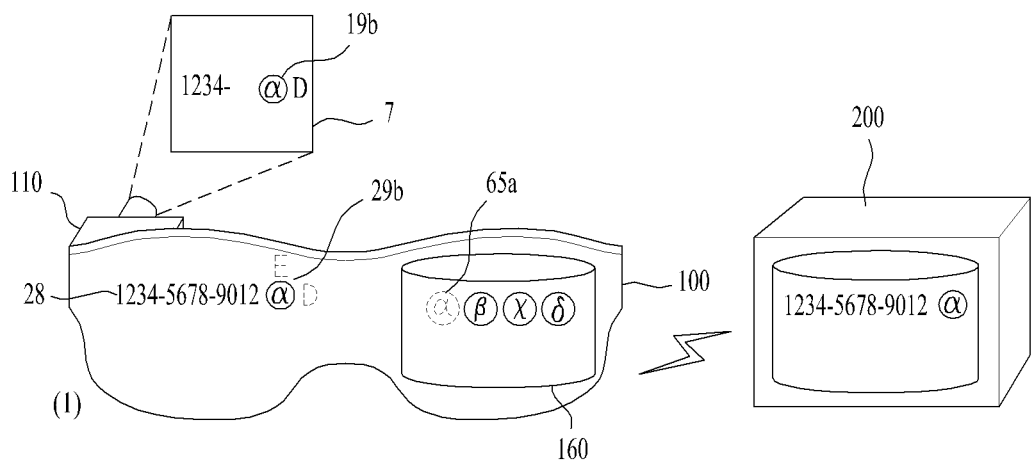
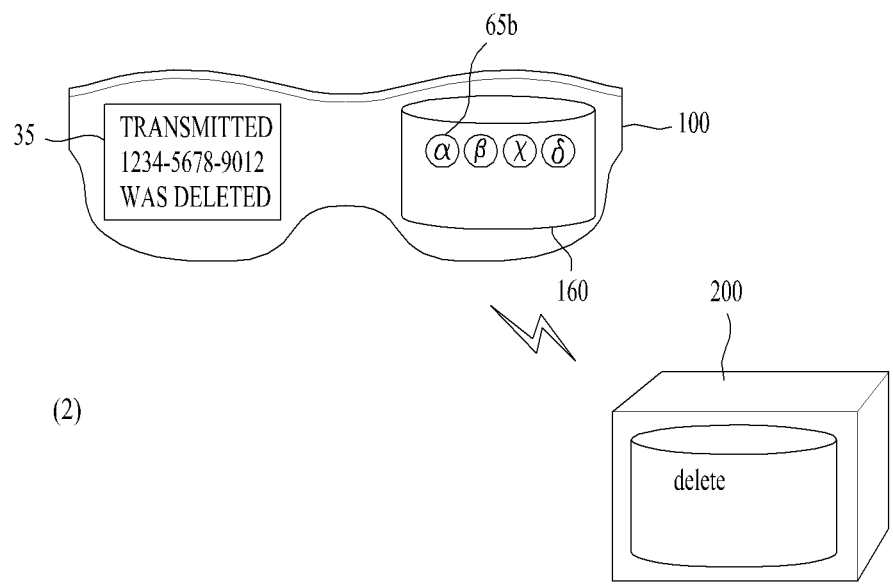

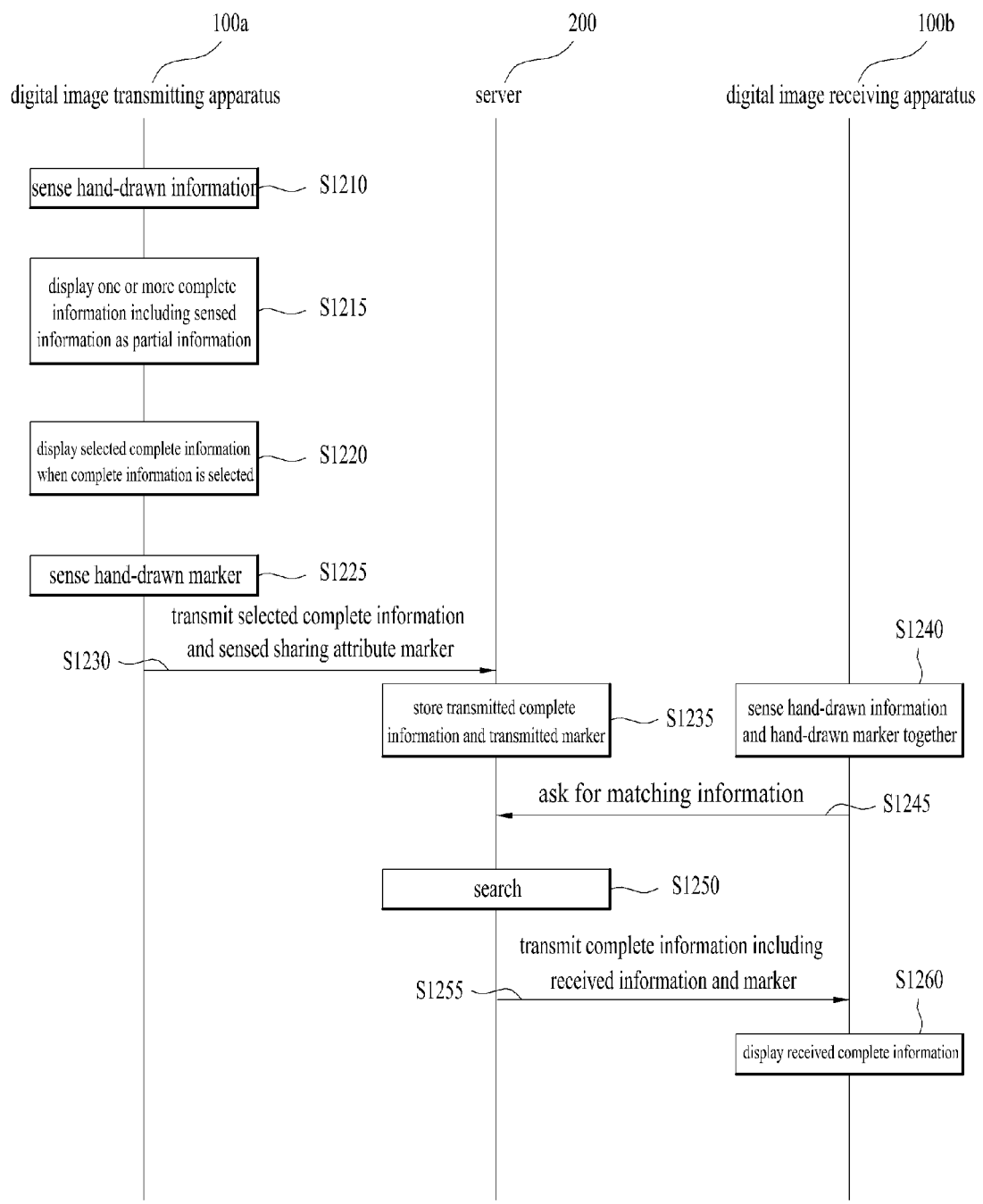

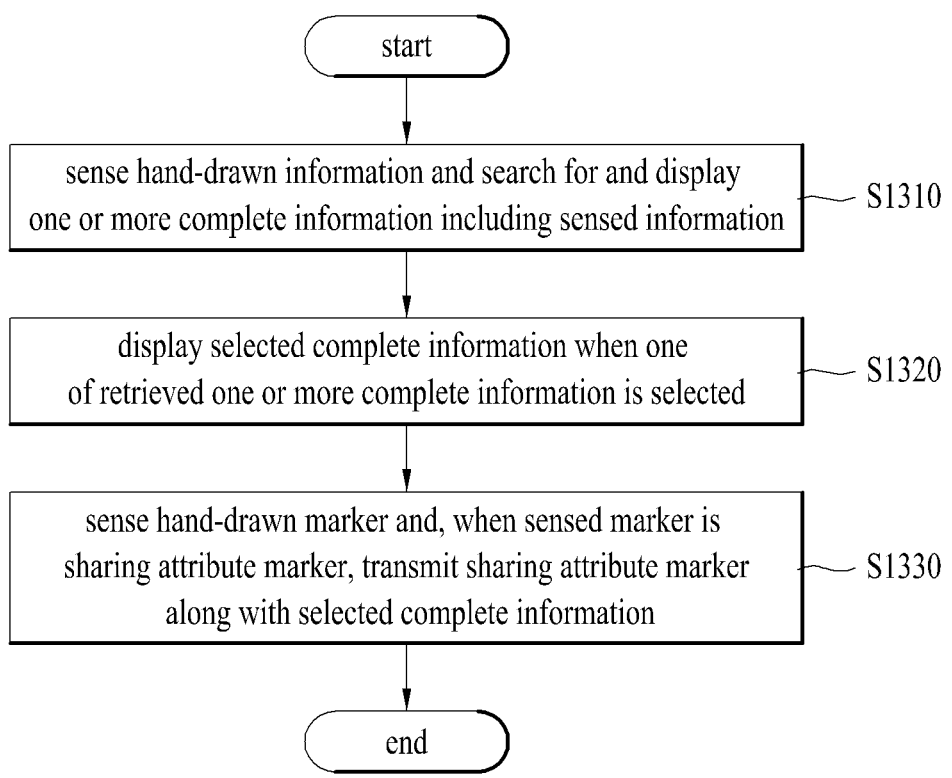

DIGITAL IMAGE PROCESSING APPARATUS AND SYSTEM AND CONTROL METHOD THEREOF

This application claims the benefit of Korean Patent Application No. 10-2014-0084957, filed on Jul. 8, 2014, which is hereby incorporated by reference as if fully set forth herein.

BACKGROUND OF THE INVENTION

Field of the Invention

The present specification relates to a digital image processing apparatus and system and a control method thereof.

Discussion of the Related Art

As digital devices have been increasingly propagated, there appear some digital devices having touch sensors that allow users to draw or write on the digital device using a stylus or fingers. Such digital devices store information, sensed by touch sensors, in digital images, and the stored digital images advantageously provide higher portability and easier correction as compared to conventional hand-drawn sketches.

However, despite propagation of the aforementioned digital devices, users still utilize hand-drawn information acquired by writing letters on a notebook or a piece of paper using a pen, a pencil or the like, and this may provide users with sense of writing that cannot be provided on the digital devices.

Meanwhile, a user may need to share information stored in his/her digital device with others. However, when the user remembers only a part of information, searching for the stored information using the remembered partial information requires a lot of time and is inconvenient.

Hence, there is a need for a method of easily searching for and sharing information stored in a digital device using hand-drawn partial information.

SUMMARY OF THE INVENTION

Accordingly, the present specification is directed to a digital image processing apparatus and system and a control method thereof that substantially obviate one or more problems due to limitations and disadvantages of the related art.

An object of the present specification is to provide a digital image processing apparatus which may search for complete information stored therein by sensing hand-drawn partial information and may share the retrieved complete information, a digital image processing system and a control method thereof.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

In accordance with one embodiment of the present specification, a digital image processing apparatus includes an image sensor unit configured to sense hand-drawn information, a display unit configured to display one or more complete information including the sensed information, the sensing information being partial information, a communication unit configured to transmit selected complete information among the one or more complete information to a server and a controller, wherein the controller controls the display unit so as to search for and display the one or more complete information including the sensed information, and also controls the display unit so as to display the selected complete information when one of the retrieved one or more complete information is selected, and wherein the controller senses a hand-drawn marker and, when the sensed marker is a sharing attribute marker, links the sharing attribute marker with the selected complete information and controls the communication unit so as to transmit the selected complete information along with the sharing attribute marker.

The controller may control the display unit so as to display the sharing attribute marker along with the selected complete information, and may link the sharing attribute marker with the selected complete information upon sensing a hand-drawn marker drawn along the displayed sharing attribute marker.

Here, the selected complete information may include at least one of an account number, a phone number, a credit card number, a password, a postal address, an e-mail address and a memo.

The selected complete information may be linked with the sharing attribute marker and transmitted to the server, thus having a sharing attribute.

Meanwhile, the digital image processing apparatus may further include a storage unit configured to store information, and the controller may search for the stored information based on the sensed information, and may control display of the one or more complete information including the sensed information among the stored information.

Here, the sharing attribute marker may be a marker set by a user.

The sharing attribute marker may be randomly produced.

Meanwhile, the controller may exclude the sharing attribute marker, transmitted along with the selected complete information, from a group of sharking attribute markers to be displayed.

The controller may add the excluded sharing attribute marker to the group of sharing attribute markers to be displayed after a predetermined time has passed.

When the transmitted complete information is deleted from the server, the communication unit may receive a message indicating deletion of the complete information from the server, and the controller may add the excluded sharing attribute marker to the group of sharing attribute markers to be displayed.

Here, the marker may include at least one a symbol, a figure, a character and a number.

The controller may divide the selected complete information into an area of the sensed information and a remaining automatically completed area.

The controller may control reception and display of complete information including the hand-drawn information and the hand-drawn marker from the server upon sensing the hand-drawn information and the hand-drawn marker together via the image sensor unit.

The controller may further transmit additional information related to the selected complete information.

The controller may execute an edit mode when a predetermined edit sign is included in the hand-drawn marker, and may control transmission of the selected complete information to the server upon completion of editing related to the selected complete information, or transmission of the additional information along with the selected complete information to the server.

Meanwhile, the editing related to the selected complete information may be performed to include at least one of virtual keyboard input and voice input.

The controller may control transmission of a command for deletion of the selected complete information to the server when a predetermined delete sign is included in the hand-drawn marker.

The controller may control output of a message to confirm whether or not the selected complete information is deleted.

In accordance with another embodiment of the present specification, a digital image transmitting/receiving system includes a digital image transmitting apparatus, a digital image receiving apparatus and a server, wherein the digital image transmitting apparatus senses hand-drawn information, displays one or more complete information including the sensed information, the sensed information being partial information, displays selected complete information when one of the one or more complete information is selected, senses a hand-drawn marker, and when the sensed marker is a sharing attribute marker, links the sharing attribute marker with the selected complete information and transmits the selected complete information along with the sharing attribute marker, wherein the server receives and stores the selected complete information and the linked sharing attribute marker, and transmits complete information including the received marker and the received information upon receiving the hand-drawn information along with the hand-drawn marker from the digital image receiving apparatus, and wherein the digital image receiving apparatus asks the server for information upon sensing the hand-drawn information and the hand-drawn marker together via an image sensor unit, and receives and displays complete information including the hand-drawn information and the hand-drawn marker from the server.

In accordance with a further embodiment of the present specification, a control method of a digital image processing apparatus, includes sensing hand-drawn information and searching for and displaying one or more complete information including the sensed information, the sensed information being partial information, displaying selected complete information when one of the retrieved one or more complete information is selected and sensing a hand-drawn marker and, when the sensed marker is a sharing attribute marker, linking the sharing attribute marker with the selected complete information and transmitting the selected complete information along with the sharing attribute marker.

It is to be understood that both the foregoing general description and the following detailed description of the present specification are exemplary and explanatory and are intended to provide further explanation of the present specification as claimed.

BRIEF DESCRIPTION OF THE DRAWINGS

The accompanying drawings, which are included to provide a further understanding of the present specification and are incorporated in and constitute a part of this application, illustrate embodiment(s) of the present specification and together with the description serve to explain the principle of the present specification. In the drawings:

FIG. 9 is a view explaining one embodiment regarding discrimination of used markers;

FIG. 10 is a view explaining a marker having an edit attribute according to one embodiment;

FIG. 11 is a view explaining a marker having a deletion attribute according to one embodiment;

FIG. 12 is a timing chart of a digital image processing system according to one embodiment; and FIG. 13 is a flow chart of a control method of a digital image processing apparatus according to one embodiment.

DETAILED DESCRIPTION OF THE INVENTION

Figure 1:
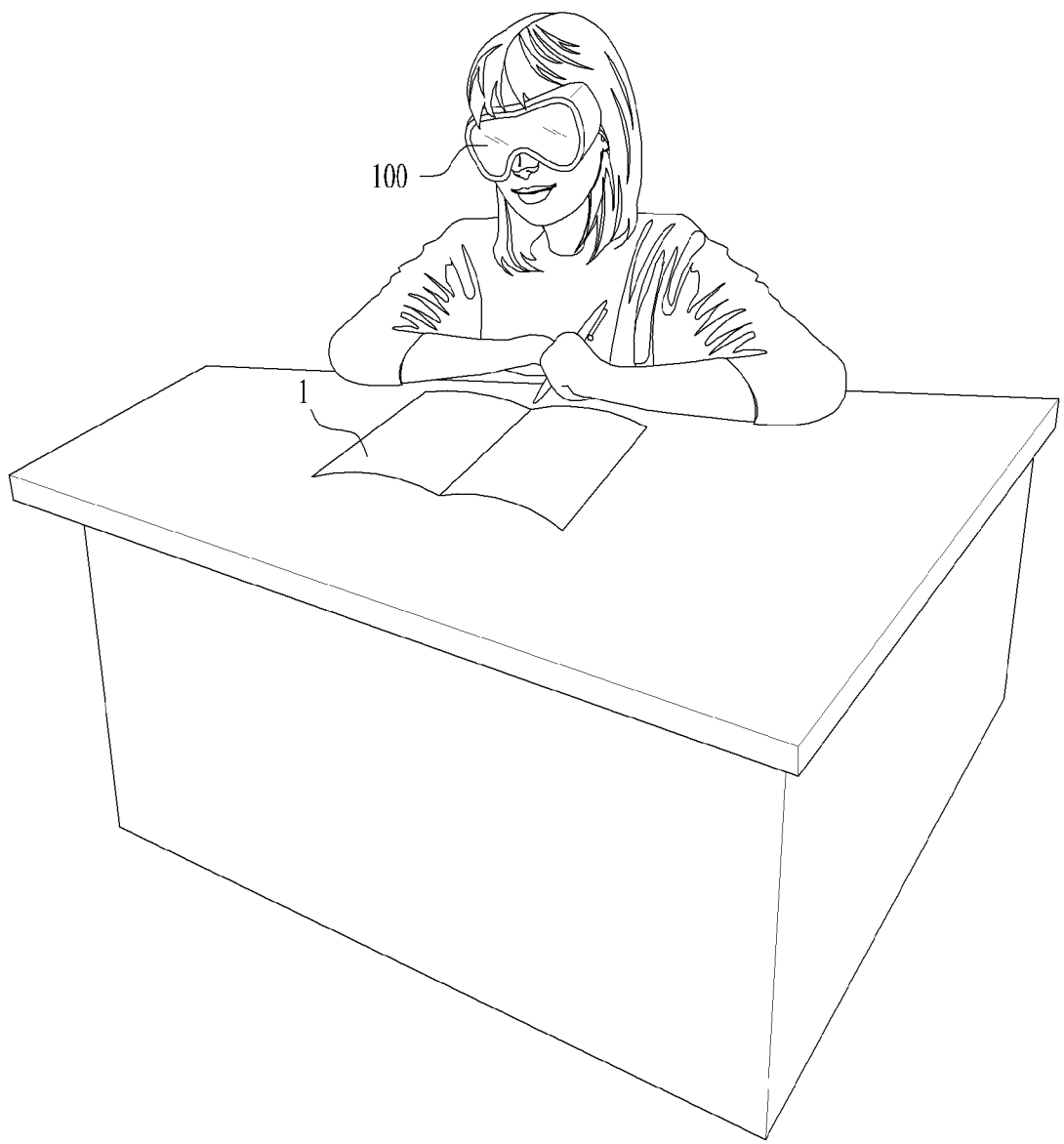
FIG. 1 is a view explaining one embodiment regarding use of a digital image processing apparatus.

Hereinafter, embodiments to concretely realize the above-described object will be described in detail with reference to the accompanying drawings. In this case, configurations and operations of the present specification as shown in the drawings and described based on the drawings are described as at least one embodiment and technical sprits of the present specification and core configurations and operations thereof are not limited by the description.

Although the terms used in the present specification are selected, as much as possible, from general terms that are widely used at present while taking into consideration the functions, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the present specification. Accordingly, it should be noted that the terms used herein should be construed based on practical meanings thereof and the whole content of this specification, rather than being simply construed based on names of the terms.

In the present specification, hand-drawn information or hand-drawn letters are physical text expressed by liquid or solid materials deposited by hand drawing of a user and may include, for example, numbers drawn on a piece of paper with a pencil, letters written on a whiteboard with a marker, characters drawn on a wall with spray paint and the like. In addition, an object that allows letters to be hand-drawn thereon, such as the aforementioned paper, whiteboard, wall and the like, may be referred to as a physical object. A digital image processing apparatus of the present specification may include a head mounted display (HMD) having a camera and a projector having an image sensor.

FIG. 1 is a view explaining one embodiment regarding use of a digital image processing apparatus.

The digital image processing apparatus 100 may sense hand-drawn letters written by a user. The digital image processing apparatus 100 may sense hand-drawn letters expressed by liquid or solid materials deposited on a physical object 1, such as a notebook, a piece of paper, a whiteboard or the like, using an image sensor. Meanwhile, the digital image processing apparatus 100 may store and read information prior to the sensing. For example, the information may include a phone number, an account number, a credit card number, a password, a postal address, an e-mail address, a memo, a diary, a schedule and the like. The digital image processing apparatus 100 may be for private use. As such, the information stored in the digital image processing apparatus 100 may be personal information and, thus, have a personal attribute or an exclusive attribute. The personal attribute may be set to a field value that is allotted on a per information basis. Alternatively, the information stored in the digital image processing apparatus 100 may not include a special attribute value, and the information having no special attribute value may be judged as having a personal attribute.

The digital image processing apparatus 100 may recognize the sensed hand-drawn letters as having a text attribute. For example, the digital image processing apparatus 100 may sense letters "3456" written on a piece of paper and recognize the same as text "3", "4", "5" and "6". The hand-drawn letters may mean hand-drawn information. The digital image processing apparatus 100 may match the hand-drawn information with stored information. The hand-drawn information may be information corresponding to a part of stored whole information. The digital image processing apparatus 100 may search for stored information including the hand-drawn information. That is, the digital image processing apparatus 100 may search for complete information including the hand-drawn information as partial information.

The digital image processing apparatus 100 may display the retrieved complete information. When there are a plurality of retrieved complete information, the digital image processing apparatus 100 may display all of the complete information. The digital image processing apparatus 100 may display no information when there is no matching complete information.

The digital image processing apparatus 100 may receive a command for selection of one of the complete information input by a user. The digital image processing apparatus 100 may display only the selected complete information and also display a marker next to the selected complete information. The marker may correspond to a command for sharing of the selected complete information. The marker may have a sharing attribute. Thus, the marker may be referred to as a sharing attribute marker. The marker may be set by the user, or may be randomly produced by the digital image processing apparatus 100.

In one embodiment, the digital image processing apparatus 100 may include information regarding one or a plurality of sharing attribute markers. In addition, the digital image processing apparatus 100 may display only the selected complete information without display of a marker. The digital image processing apparatus 100 may sense a hand-drawn marker. The digital image processing apparatus 100 may judge whether or not the sensed hand-drawn marker is a sharing attribute marker. When the hand-drawn marker is a sharing attribute marker, the digital image processing apparatus 100 may link the sharing attribute marker with the selected complete information. As described above, the hand-drawn marker is a sharing attribute marker. Thus, the digital image processing apparatus 100 may link the sensed hand-drawn marker with the selected complete information. That is, a link between the sharing attribute marker and the selected complete information is the same meaning as a link between the sensed hand-drawn marker and the selected complete information.

In another embodiment, the digital image processing apparatus 100 may include a transparent display unit. The digital image processing apparatus 100 may display a marker on the display unit. The user may recognize the marker as being displayed on the physical object 1, in which hand-drawn information is recorded, via the display unit. That is, the digital image processing apparatus 100 may view the marker on the physical object 1 in the background. In some cases, the digital image processing apparatus 100 may project the marker onto the physical object 1. The user may hand-draw a marker over the physical object 1. The digital image processing apparatus 100 may sense the hand-drawn marker. The digital image processing apparatus 100 may link the sensed marker with selected complete information and transmit the same to a server. That is, the marker may have a server transmission attribute. As described above, a link between the sensed marker and the selected complete information is the same meaning as a link between a sharing attribute marker and the selected complete information.

The digital image processing apparatus 100 may include a projector or a head mounted display (HMD). Hereinafter, a configuration and an operating method of the digital image processing apparatus 100 will be described in detail.

Figure 2:
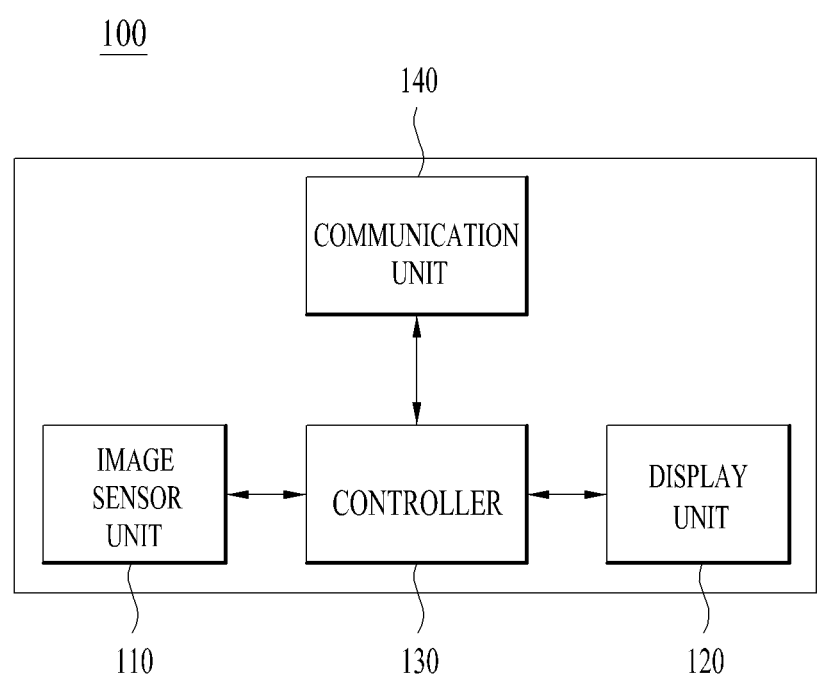
FIG. 2 is a block diagram of a digital image processing apparatus according to one embodiment.

FIG. 2 is a block diagram of a digital image processing apparatus according to one embodiment.

Referring to FIG. 2, the digital image processing apparatus 100 may include an image sensor unit 110, a display unit 120, a controller 130 and a communication unit 140.

The image sensor unit 110 may sense hand-drawn information. The image sensor unit 110 may include a motion sensor, a video sensor or the like. The digital image processing apparatus 100 may sense the hand-drawn information and convert the same into a digital image using the image sensor unit 110. The image sensor unit 110 may sense hand-drawn partial information and convert the same into a digital image, and may sense a hand-drawn marker and convert the same into a digital image. For example, the image sensor unit 110 may take the form of a camera.

The display unit 120 may display complete information including the sensed information as partial information. The display unit 120 may be a transparent display unit. In addition, the display unit 120 may project a digital image onto a physical object. The display unit 120 may include a display unit of an HMD or a beam projector. The display unit 120 may display a marker. When one complete information is selected, the marker may be displayed next to the selected complete information. The display unit 120 may display the marker, or may project the marker, in a digital image form, onto a physical object.

The controller 130 may search for information including the sensed information from among pre-stored information. The hand-drawn information is a part of whole information and, thus, may be referred to as partial information, and the pre-stored information is whole information and, thus, may be referred to as complete information. The complete information is information stored in the digital image processing apparatus 100 and the digital image processing apparatus 100 may be for private use. Thus, the complete information may be personal information.

The controller 130 may control the display unit 120 so as to search for and display one or more complete information including the sensed information. As described above, the complete information may be displayed on the display unit 120, or may be projected onto a physical object so as to be displayed on the physical object.

The digital image processing apparatus 100 receives a command for selection of one complete information input by the user. When one of the retrieved complete information is selected, the controller 130 may control the display unit 120 so as to display a marker along with the selected complete information. When a hand-drawn marker that is drawn along the displayed marker is sensed, the controller 130 may link the marker with the selected complete information and control the communication unit 140 so as to transmit the marker and the selected complete information together. Thus, the marker may have a server transmission attribute. There are markers including symbols, figures, characters and numbers. The markers may include one of symbols, figures, characters and numbers, or combinations of two or more thereof.

The communication unit 140 may transmit the selected complete information to a server. The communication unit 140 may be connected to an external network in a wired or wireless manner to transmit and receive digital data. When the digital image processing apparatus 100 senses hand-drawn partial information and a hand-drawn marker, the communication unit 140 may receive matching complete information from the server.

Although the complete information may be personal information, the complete information may be shared with others as it is linked with the marker and transmitted to the server. Thus, the transmitted complete information may have a sharing attribute.

Figure 3:
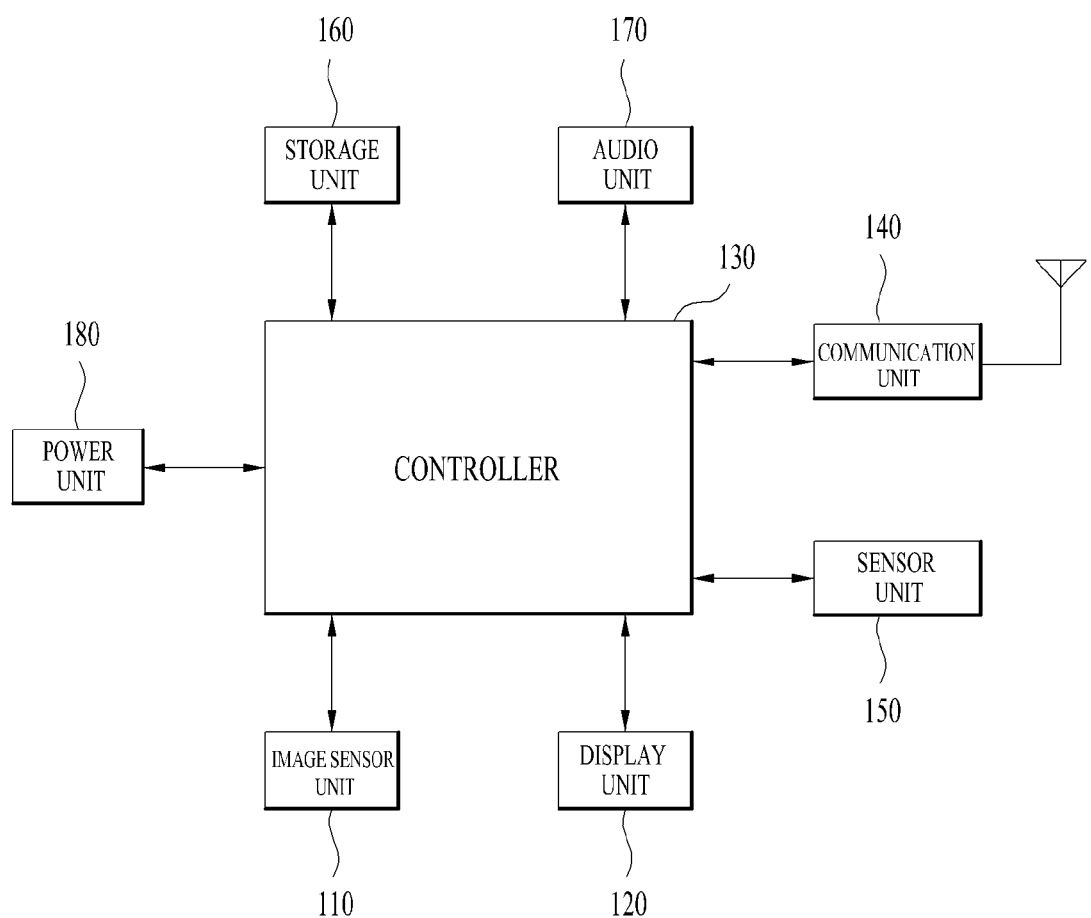
FIG. 3 is a block diagram of a digital image processing apparatus according to another embodiment.

FIG. 3 is a block diagram of a digital image processing apparatus according to another embodiment.

Referring to FIG. 3, the digital image processing apparatus may include the image sensor unit 110, the display unit 120, the controller 130, the communication unit 140, a sensor unit 150, a storage unit 160, an audio unit 170 and a power unit 180.

The image sensor unit 110, the display unit 120, the controller 130 and the communication unit 140 are identical to those as described above with reference to FIG. 2.

The sensor unit 150 may transmit user input or an environment, recognized by the digital image processing apparatus, to the controller 130 using a plurality of sensors mounted in the digital image processing apparatus. The sensor unit 150 may include a plurality of sensors. The sensors may include a gravity sensor, a geomagnetic sensor, a motion sensor, a gyro sensor, an accelerometer, an inclination sensor, a brightness sensor, a height sensor, an olfactory sensor, a temperature sensor, a depth sensor, a pressure sensor, a bending sensor, an audio sensor, a video sensor, a GPS sensor, a touch sensor and the like.

The storage unit 160 may store various digital data, such as video, audio, pictures, moving images, applications and the like. The storage unit 160 may store personal information of the user. For example, the personal information may include a phone number, an account number, a credit card number, a password, a postal address, an e-mail address, a memo, a diary, a schedule and the like. In addition, the storage unit 160 may store a marker set by the user, or a predetermined marker. Alternatively, the storage unit 160 may store a program, a marker producing function, or the like that may randomly produce a marker.

The digital image processing apparatus may search for information stored in the storage unit 160 based on the hand-drawn information sensed via the image sensor unit 110. The digital image processing apparatus may display information matching the sensed hand-drawn information among the stored information on the display unit 120.

For example, the storage unit 160 may include a hard disk drive (HDD), a solid state drive (SSD), a compact disk (CD), a digital video disk (DVD), a Blu-Ray disc, a floppy disk drive (FDD), a magnetic disc, a RAM, a ROM, a memory card, a flash memory, a USB memory or the like.

The audio unit 170 may include an audio output means, such as a speaker or the like, and an audio input means, such as a microphone or the like, and may perform audio output from the digital image processing apparatus and audio input to the digital image processing apparatus. The audio unit 170 may serve as an audio sensor.

The audio unit 170 may recognize a user command by analyzing and processing voice input via the audio input means. The recognized command may be transmitted to the controller 130 for control of the digital image processing apparatus. In one embodiment, the digital image processing apparatus may process user voice input via the audio unit 170 in a memo taking mode and store the processed user voice in a text memo form.

The power unit 180 is a battery incorporated in the digital image processing apparatus or a power source connected to an external power source. The power unit 180 may supply power to the digital image processing apparatus.

The respective constituent elements of the digital image processing apparatus have been described up to now. Hereinafter, a detailed operating method of the digital image processing apparatus will be described.

Figure 4:
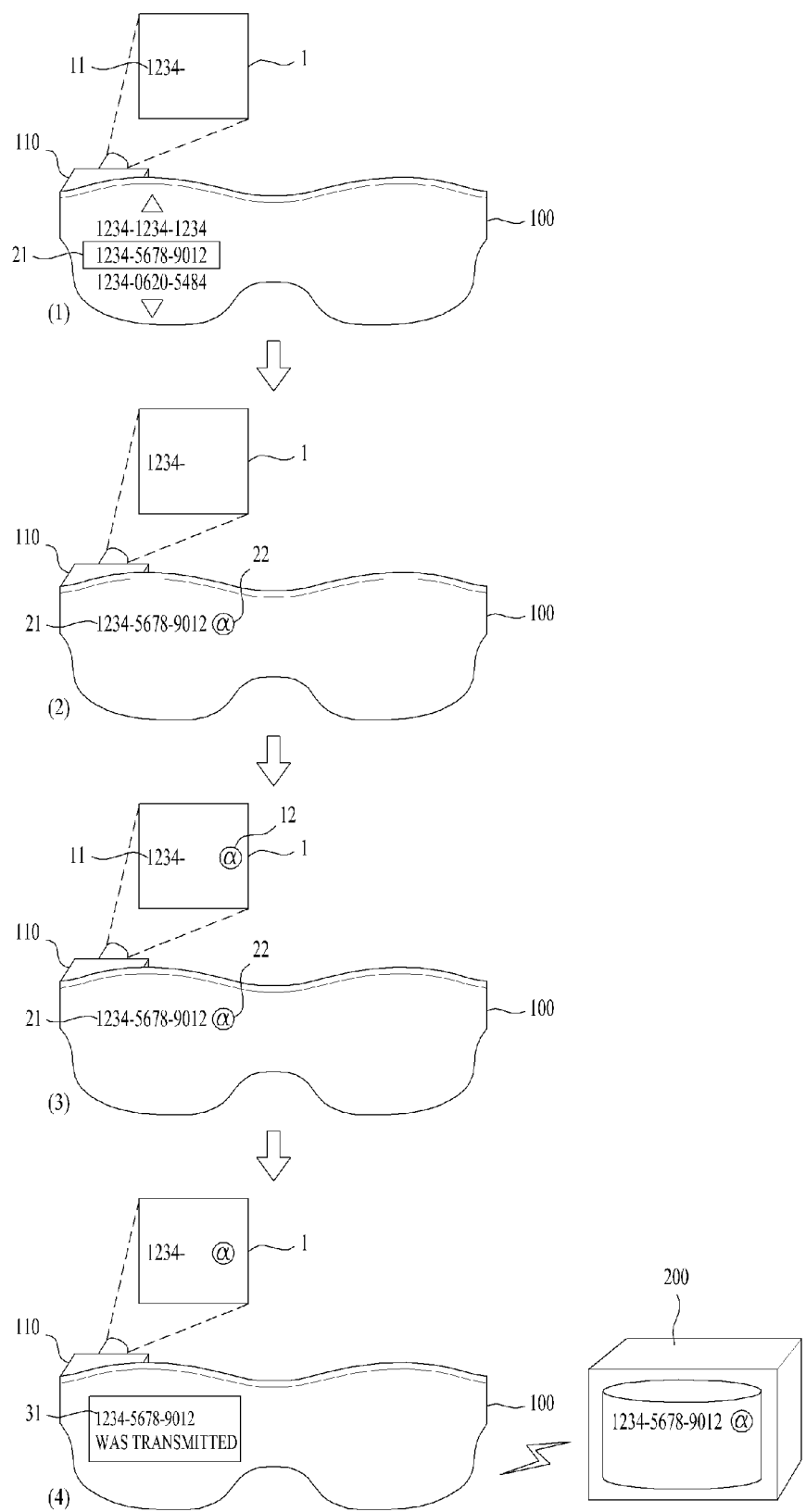
FIG. 4 is a view explaining one embodiment regarding sensing of hand-drawn partial information and sharing of complete information.

FIG. 4 is a view explaining one embodiment regarding sensing of hand-drawn partial information and sharing of complete information.

With reference to FIG. 4(1), the digital image processing apparatus 100 and the physical object 1 on which hand-drawn information 11 is written are shown. The digital image processing apparatus 100 may sense the hand-drawn information 11 written on the physical object 1 using the image sensor unit 110. As exemplarily shown in FIG. 4(1), the digital image processing apparatus 100 may sense the hand-drawn information 11 and search for stored information using the sensed information. The digital image processing apparatus 100 may search for information matching the sensed information among the stored whole information. The information matching the sensed information may correspond to the whole information, or may correspond to a part of the whole information. For convenience of description, the sensed hand-drawn information is referred to as partial information and the retrieved information is referred to as complete information.

The digital image processing apparatus 100 may display complete information. When there are a plurality of complete information and all of the complete information cannot be displayed on a single screen, the digital image processing apparatus 100 may display a possible display number of complete information. In addition, the digital image processing apparatus 100 may display that there exist additional complete information using up and down scroll signs. The digital image processing apparatus 100 exemplarily shown in FIG. 4(1) includes such up and down scroll signs. This means that additional complete information exists above and below displayed complete information. The digital image processing apparatus 100 may select one complete information 21 by user selection. The digital image processing apparatus 100 may process the selected complete information 21 to visually display the same by high-lighting it, by displaying it in different writing styles, by displaying it in a 3-dimensional manner, and the like.

With reference to FIG. 4(2), the digital image processing apparatus 100 on which the selected complete information 21 is displayed is shown. When one complete information 21 is selected, the digital image processing apparatus 100 may display a marker 22 next to the selected complete information. The digital image processing apparatus 100 may display the marker 22 on a display unit and may project the marker 22 onto the physical object 1 so as to display the marker 22 on the physical object 1. The digital image processing apparatus 100 may include a transparent display unit. Thus, the digital image processing apparatus 100 may allow the marker 22 to be perceived by the user as being projected onto the physical object 1 even when the marker 22 is displayed on the display unit.

The marker 22 may be randomly produced and may be set by the user. In addition, the digital image processing apparatus 100 may transmit the selected complete information to a server 200 upon recognizing the marker 22 and, therefore, the marker 22 may have a server transmission attribute. The marker 22 may be expressed by symbols, figures, characters and numbers.

With reference to FIG. 4(3), the digital image processing apparatus 100 on which the selected complete information 21 and the marker 22 are displayed and the physical object 1 on which the hand-drawn partial information 11 and a hand-drawn marker 12 are displayed are shown.

The digital image processing apparatus 100 may display the marker 22 on the display unit, or may project the marker 22 onto the physical object 1. Based on the displayed marker 22, the user may hand-draw the marker 12 having the same shape as the displayed marker 22. The digital image processing apparatus 100 may sense the hand-drawn marker 12. The digital image processing apparatus 100 may judge whether or not the hand-drawn marker 12 and the displayed marker 22 are the same. Judgment as to whether the hand-drawn marker 12 and the displayed marker 22 are the same may be performed via image processing.

In one embodiment, the digital image processing apparatus 100 may extract characteristic points from f major parts of the hand-drawn marker 12 and extract characteristic points from major parts of the displayed marker 22. The digital image processing apparatus 100 may interconnect the extracted characteristic points. The digital image processing apparatus 100 may judge whether or not the hand-drawn marker 12 and the displayed marker 22 are the same by comparing the characteristic points, connection lines between the characteristic points, sections between the connection lines and the like.

With reference to FIG. 4(4), the digital image processing apparatus 100 that transmits information to the server 200 is shown. The digital image processing apparatus 100 may sense the hand-drawn marker 12 to judge whether or not the hand-drawn marker 12 and the displayed marker 22 are the same. Upon judging that the two markers are the same, the digital image processing apparatus 100 may link the hand-drawn marker 12 with the selected complete information 21. The digital image processing apparatus 100 may link a corrected marker with the selected complete information 21 instead of linking the hand-drawn marker 12 with the selected complete information 21. That is, the digital image processing apparatus 100 may link the displayed marker 22 with the selected complete information 21. As described above, the digital image processing apparatus 100 has confirmed that the hand-drawn marker 12 and the displayed marker 22 are the same. Thus, linking whichever of the two markers with the selected complete information 21 is same for the digital image processing apparatus 100. That is, the digital image processing apparatus 100 may link marker information instead of a real marker.

The digital image processing apparatus 100 may transmit the selected complete information 21 and the linked marker 22 to the server 200. The server 200 may receive and store the selected complete information 21 and the linked marker 22 transmitted from the digital image processing apparatus 100. Once transmission is completed, the digital image processing apparatus 100 may display a transmission completion message 31.

As described above, the digital image processing apparatus 100 may include more than one sharing attribute marker, but not display the marker. The digital image processing apparatus 100 may sense a marker hand-drawn by the user and judge whether or not the sensed hand-drawn marker is a sharing attribute marker. When the sensed marker is the sharing attribute marker, the digital image processing apparatus 100 may link the sharing attribute marker with the selected complete information and transmit the same to the server. That is, the digital image processing apparatus 100 may link the sensed marker with the selected complete information and transmit the same to the server.

An embodiment in which the digital image processing apparatus 100 transmits only complete information, such as an account number, a phone number or the like, to the server 200 has been described with reference to FIG. 4. Hereinafter, an embodiment in which the digital image processing apparatus 100 transmits additional information related to complete information will be described.

Figure 5:
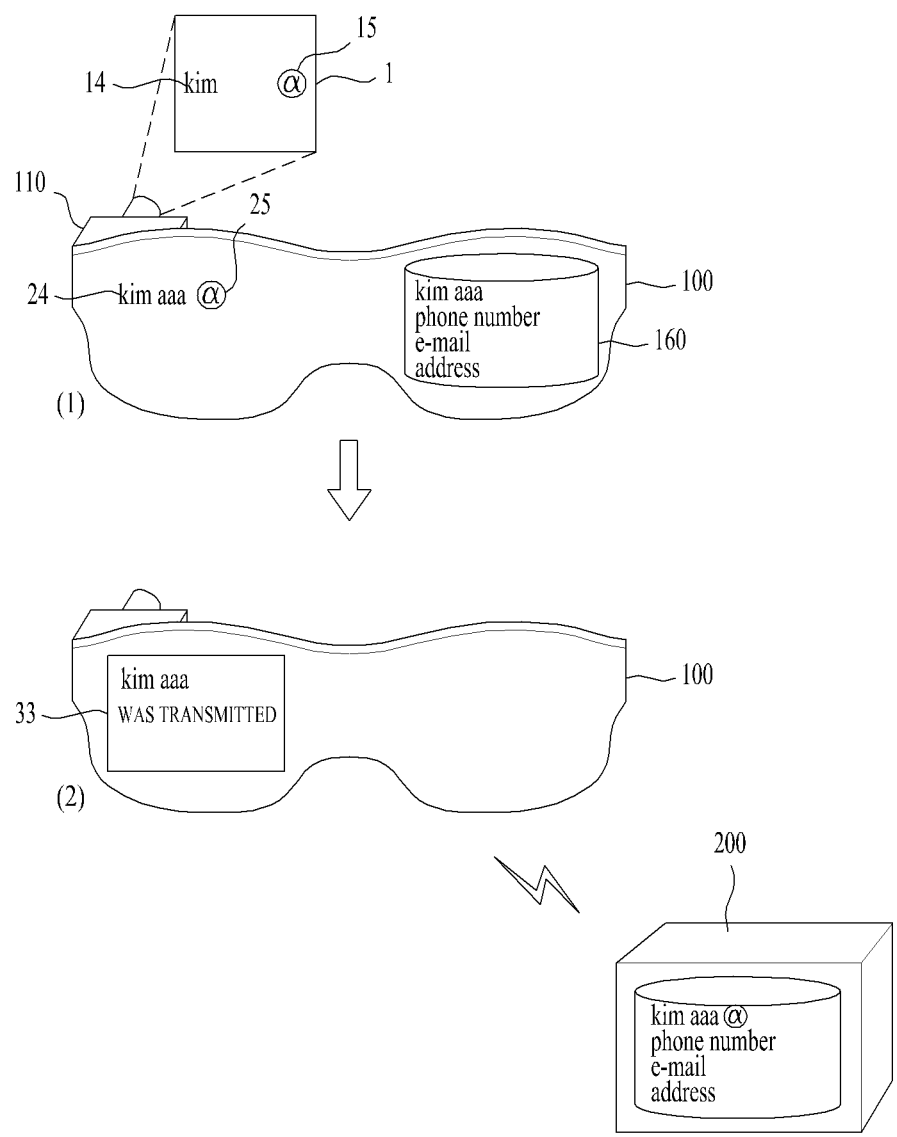
FIG. 5 is a view explaining one embodiment regarding transmission of complete information as well as related additional information.

FIG. 5 is a view explaining one embodiment regarding transmission of complete information as well as related additional information.

With reference to FIG. 5(1), the physical object 1 and the digital image processing apparatus 100 are shown. As described above with reference to FIG. 4, when the user hand-draws information 14 on the physical object 1, the digital image processing apparatus 100 may sense the hand-drawn information 14 on the physical object 1. The digital image processing apparatus 100 may search for stored information based on the sensed hand-drawn information 14. The digital image processing apparatus 100 may display the retrieved information and select one of the retrieved information (or complete information) by user selection.

In one embodiment, a hand-drawn name 14 expressed by "Kim" may be written on the physical object 1, and the digital image processing apparatus 100 may search for a plurality of information including "Kim". The digital image processing apparatus 100 may select a name 24 expressed by "Kim aaa" by user selection. The storage unit 160 of the digital image processing apparatus 100 may further store information related to the selected name. For example, the storage unit 160 may store the name "Kim aaa" and related additional information, such as a phone number, an e-mail address and a postal address.

The digital image processing apparatus 100 may display a marker 25 next to the selected complete information 24 and sense a hand-drawn marker 15 on the physical object 1. The digital image processing apparatus 100 may judge whether or not the hand-drawn marker 15 and the displayed marker 25 are the same.

With reference to FIG. 5(2), the digital image processing apparatus 100 that transmits information to the server 200 is shown. The digital image processing apparatus 100 may link the marker 25 with the selected complete information 24 upon judging that the two markers are the same. The digital image processing apparatus 100 may transmit the selected complete information 24 and the linked marker 25 to the server 200. The digital image processing apparatus 100 may further transmit additional information related to the selected complete information 24. The server 200 may receive and store the selected complete information 24, the linked marker 22 and the additional information from the digital image processing apparatus 100. In one embodiment, the digital image processing apparatus 100 may link selected complete information "Kim aaa" and additional information including a phone number, an e-mail address, a postal address and the like with a maker and transmit the same to the server 200. Alternatively, the digital image processing apparatus 100 may link a marker with selected complete information and also link the selected complete information with related additional information, and then transmit the same to the server 200. The additional information may include a phone number, an ID, an SNS address, a picture and the like. The digital image processing apparatus 100 may display a transmission completion message 33 after completion of transmission.

The digital image processing apparatus 100 may serve as a receiver.

Figure 6:
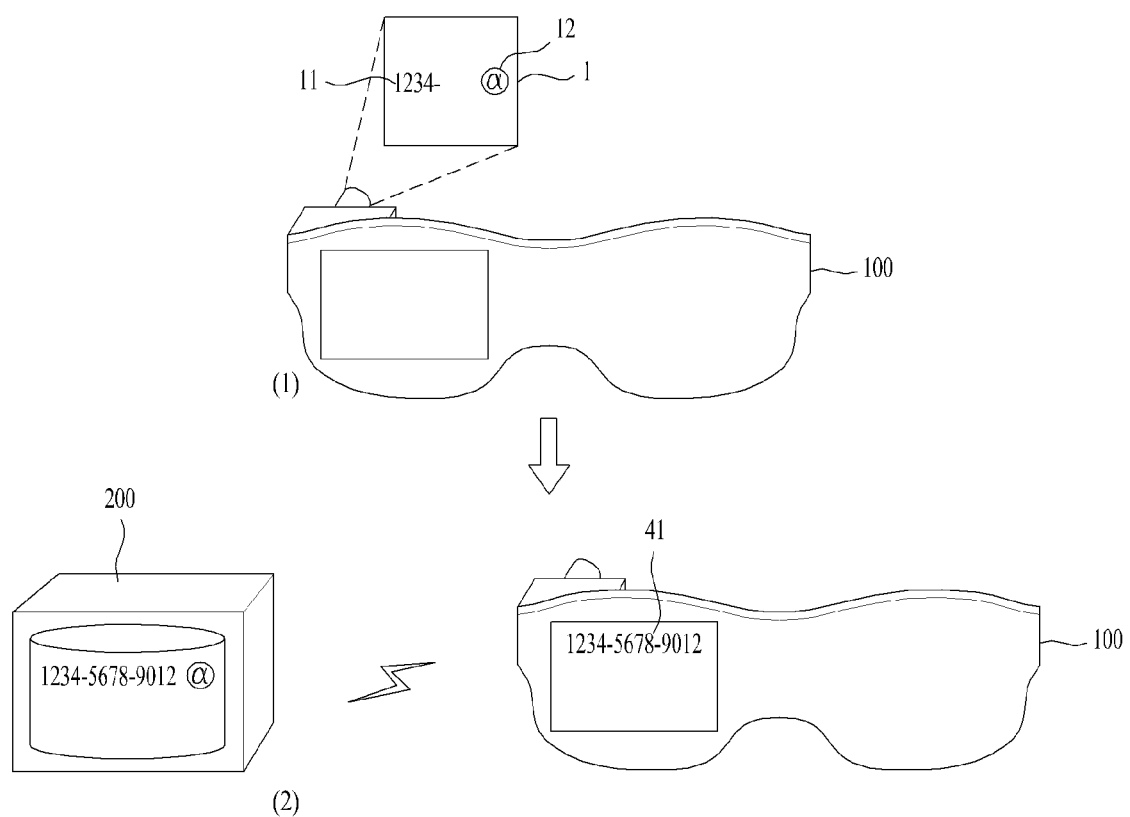
FIG. 6 is a view explaining one embodiment regarding reception and display of shared complete information.

FIG. 6 is a view explaining one embodiment regarding reception and display of shared complete information.

With reference to FIG. 6(1), the physical object 1 including hand-drawn information and the digital image processing apparatus 100 are shown. The physical object 1 may include the hand-drawn partial information 11 and the hand-drawn marker 12. As described above with reference to FIG. 2, even if the digital image processing apparatus 100 transmits the selected complete information and the marker to the server 200, hand-drawn letters on the physical object 1 remain. The digital image processing apparatus 100 may receive information stored in the server 200 using the physical object 1 on which the hand-drawn letters remain.

The digital image processing apparatus 100 may sense the hand-drawn partial information 11 and the hand-drawn marker 12 written on the physical object 1. The digital image processing apparatus 100 may transmit the hand-drawn partial information 11 and the hand-drawn marker 12 to the server 200 upon sensing the partial information 11 and the marker 12 together.

With reference to FIG. 6(2), the digital image processing apparatus 100 that receives matching information from the server 200 is shown. The matching information refers to complete information including transmitted information and a marker. For example, when the transmitted information is "1234", the transmitted marker is α (alpha) and first information stored in the server 200 is 1234-5678-9012+α (alpha), the stored first information is information matching the transmitted information and the marker.

The server 200 may receive the partial information 11 and the marker 12 and search for the stored information. The server 200 may search for complete information including the partial information 11 and judge whether or not the retrieved complete information matches the linked marker. When the complete information matching the linked marker and including the partial information 11 is retrieved, the server 200 may transmit the retrieved complete information to the digital image processing apparatus 100. The digital image processing apparatus 100 may receive and output complete information 41. The digital image processing apparatus 100 may output only the complete information 41 without output of the marker.

Meanwhile, the digital image processing apparatus 100 may separately recognize a hand-drawn area and an automatically selected area upon transmitting selected complete information to the server.

Figure 7:
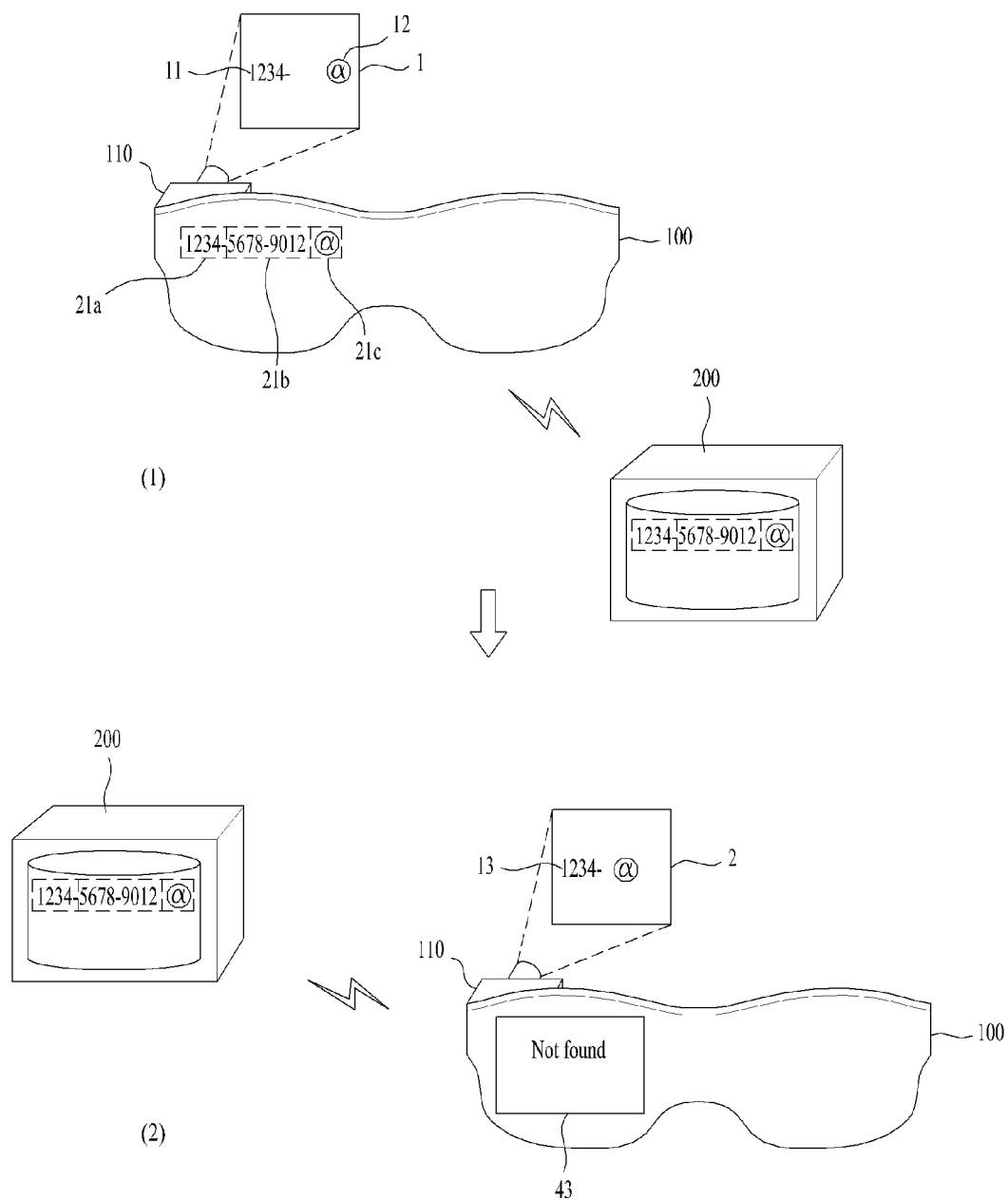
FIG. 7 is a view explaining one embodiment regarding separation of a hand-drawn area from a remaining automatically completed area.

FIG. 7 is a view explaining one embodiment regarding separation of a hand-drawn area from a remaining automatically completed area.

With reference to FIG. 7(1), the digital image processing apparatus 100 that transmits selected complete information to the server 200 is shown. A process in which the digital image processing apparatus 100 senses hand-drawn information and a marker written on a physical object and transmits the same to the server 200 has been described above and, thus, a detailed description thereof will be omitted below.

When the digital image processing apparatus 100 selects one complete information and displays a marker, the selected complete information and the marker may be divided into two parts or three parts. When divided into two parts, the selected complete information and the marker may be divided into hand-drawn areas 21a and 21c and an automatically completed area 21b. When divided into three parts, the selected complete information and the marker may be divided into a hand-drawn information area 21a, an automatically completed information area 21b and a hand-drawn marker area 21c. The hand-drawn information area 21a may be referred to as a sensed information area. The automatically completed information area 21b may be referred to as an automatically completed area. The digital image processing apparatus 100 may transmit information of the divided two or three areas as well as the selected complete information and the marker to the server 200. The server 200 may store the information of the divided two or three areas as well as the selected complete information and the marker received from the digital image processing apparatus 100.

In FIG. 7(2), the digital image processing apparatus 100 that searches for the server 200 using area information is shown. The user may hand-draw partial information on the physical object upon transmitting information stored in the digital image processing apparatus 100 to the server 200. The digital image processing apparatus 100 may display complete information including partial information. Then, when one complete information is selected, the digital image processing apparatus 100 may display a marker next to the selected complete information. The digital image processing apparatus 100 may display the marker on the display unit, or may project the marker onto the physical object.

The digital image processing apparatus 100 may sense a hand-drawn marker. In the case in which the user hand-draws a marker, the user may hand-draw the marker on the physical object while viewing complete information and a marker displayed on the digital image processing apparatus 100. Since the marker is displayed next to the complete information, the hand-drawn marker, as exemplarily shown in FIG. 7(1), may be spaced apart from the hand-drawn partial information 11 by a given distance. The digital image processing apparatus 100 may sense the given distance between the hand-drawn partial information 11 and the hand-drawn marker 12 as the automatically completed information area 21b and transmit information of each area to the server 200.

Assume that the user hand-draws information and a marker 13 on another physical object 2, which are identical to those shown in FIG. 7(1) but have no distance therebetween. The digital image processing apparatus 100 may sense the new hand-drawn information and the marker 13. However, the server 200 stores information of divided two or three areas along with the hand-drawn information and the marker. Therefore, the server 200 may not judge the presence of matching complete information when the area information does not match even if the hand-drawn information and the marker 13 match each other. The server 200 may transmit an information absence message to the digital image processing apparatus 100 when there is no matching complete information. The digital image processing apparatus 100 may display a message 43 indicating the absence of matching information.

Assume that the digital image processing apparatus 100 senses the hand-drawn information 11 and the marker 12 drawn on the original physical object 1. There exists a given area between the hand-drawn information 11 and the marker 12 drawn on the original physical object 1. Thus, the digital image processing apparatus 100 may sense the given area as the automatically completed information area 21b. The digital image processing apparatus 100 may transmit the hand-drawn information, the marker and information of the area to the server 200, and the server 200 may search for complete information matching the hand drawn information, the marker and the area information. The digital image processing apparatus 100 may receive and display the retrieved complete information from the server 200.

Meanwhile, the marker may be set by the user.

Figure 8:
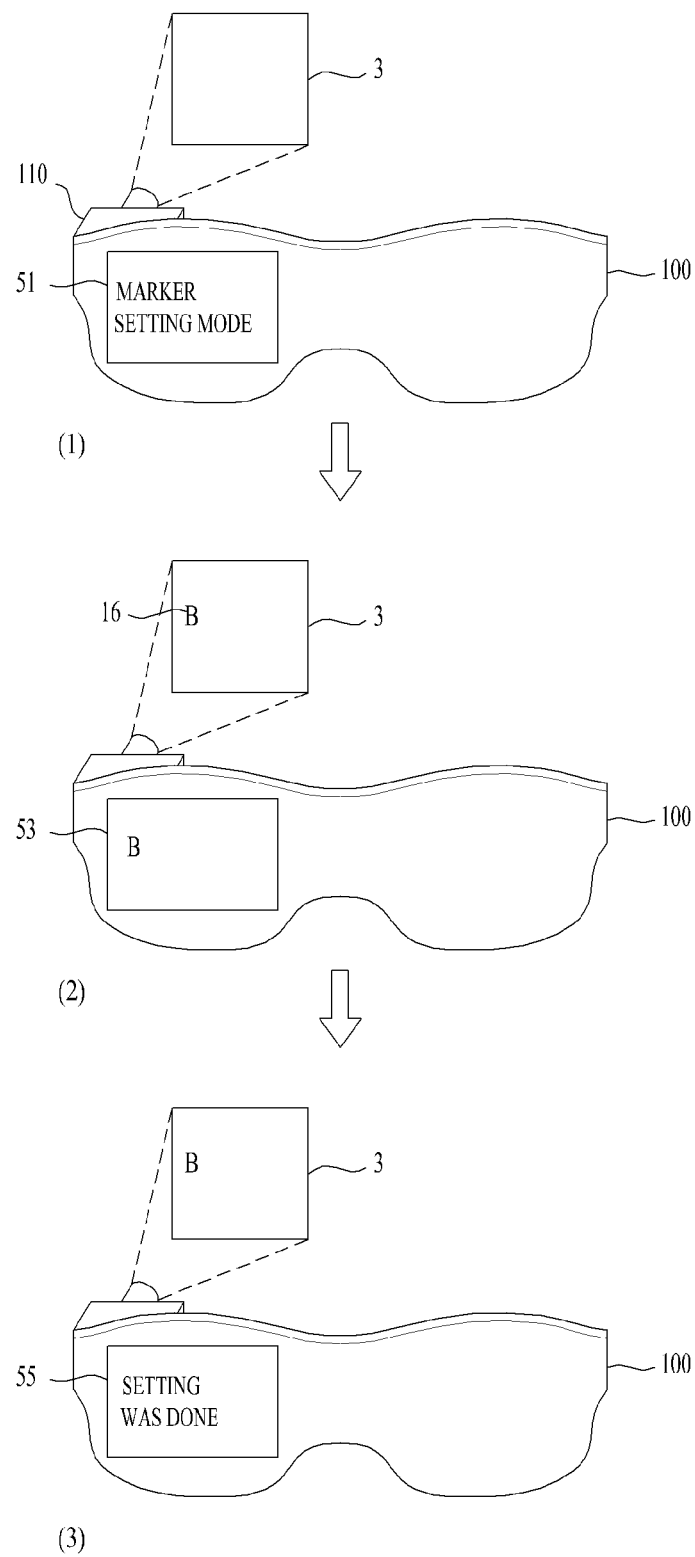
FIG. 8 is a view explaining a method of setting a marker by a user according to one embodiment.

FIG. 8 is a view explaining a method of setting a marker by the user according to one embodiment.

With reference to FIG. 8(1), the digital image processing apparatus 100 may execute a marker setting mode 51. The digital image processing apparatus 100 may include the marker setting mode 51 and execute the marker setting mode 51 by user selection. In one embodiment, the digital image processing apparatus 100 may display a message indicating initiation of the marker setting mode and may display a notification representing a marker setting mode state. Alternatively, the digital image processing apparatus 100 may output a message that commands drawing of a marker to be set on a physical object 3.

With reference to FIG. 8(2), the digital image processing apparatus 100 may sense a marker 16 drawn on the physical object 3. The digital image processing apparatus 100 may recognize the marker 16 drawn by the user using image processing. For example, the digital image processing apparatus 100 may recognize the drawn marker 16 in an image form, a text form or the like. Alternatively, the digital image processing apparatus 100 may recognize the same in combinations of a plurality of forms. The digital image processing apparatus 100 may display the recognized marker 53 on the display unit to allow the user to confirm the marker 53.

With reference to FIG. 8(3), the digital image processing apparatus 100 may set the recognized marker 16 to a marker having a server transmission attribute. The digital image processing apparatus 100 may set the recognized marker 16 to a marker for sharing upon receiving a setting command from the user. As described above, personal information included in the digital image processing apparatus 100 may be coupled to the marker and transmitted to the server to allow other users to share the same. As such, the marker may have a server transmission attribute and a sharing attribute. The digital image processing apparatus 100 may output a setting completion message 55.

Meanwhile, the markers may be individually used on a per information basis for discrimination of information transmitted to the server.

FIG. 9 is a view explaining one embodiment regarding discrimination of used markers.

With reference to FIG. 9(1), the digital image processing apparatus 100 that transmits one information is shown. As described above, the digital image processing apparatus 100 may output complete information including partial information upon sensing hand-drawn partial information on a physical object 4. The digital image processing apparatus 100 may select one complete information and display a marker. The digital image processing apparatus 100 may transmit the selected complete information to the server upon sensing the same hand-drawn marker as the displayed marker.

In one embodiment, markers may be stored in the storage unit 160. The digital image processing apparatus 100 may display one marker among the stored markers. Alternatively, the digital image processing apparatus 100 may include a marker producing algorithm. The digital image processing apparatus 100 may produce markers using the algorithm. The markers may be randomly produced.

In one embodiment, the digital image processing apparatus 100 may display a marker 61 expressed by a (alpha) in order to transmit first information to the server. The marker 61 expressed by a (alpha) may be a pre-stored marker or may be a first marker produced using the marker producing algorithm.

When the same marker 17 as the marker 61 displayed on the physical object is drawn, the digital image processing apparatus 100 may link the displayed marker 61 with selected complete information and transmit the same to the server. As described above, the displayed marker 16 and the hand-drawn marker 17 are the same. The digital image processing apparatus 100 may check the used markers for discrimination of transmitted information. That is, the digital image processing apparatus 100 may exclude the marker transmitted along with the selected complete information from markers to be displayed.

With reference to FIG. 9(2), the digital image processing apparatus 100 that transmits other information is shown. The digital image processing apparatus 100 may transmit other information. The digital image processing apparatus 100 may display a marker to transmit the same to the server. The displayed marker may be an arbitrary marker selected from among markers stored in the storage unit 160. However, the previously used marker 61 expressed by α (alpha) cannot be selected. Alternatively, the digital image processing apparatus 100 may produce arbitrary markers except for the previously used marker 61 expressed by α (alpha). In one embodiment, the digital image processing apparatus 100 may select and display a marker 63 expressed by χ (chi).

The digital image processing apparatus 100 may sense hand-drawn partial information and a hand-drawn marker 18 on another physical object 5. Upon judging that the hand-drawn marker 18 and the displayed marker 63 expressed by χ (chi) are the same, the digital image processing apparatus 100 may link selected complete information with the displayed marker 63 and transmit the same to the server. The digital image processing apparatus 100 may exclude the transmitted marker, i.e. the marker 63 expressed by χ (chi) from markers to be displayed.

The markers may basically have a server transmission attribute. In addition, the markers may further have one or more other attributes.

FIG. 10 is a view explaining a marker having an edit attribute according to one embodiment.

With reference to FIG. 10(1), a marker having an edit attribute is shown. The digital image processing apparatus 100 may output complete information by sensing partial information drawn on a physical object 6 and display a marker 29a when one complete information 27 is selected. The marker 29a may include an option to identify an additional attribute in a basic form. In one embodiment, the marker 29a may include an "E" option to identify an edit attribute and a "D" option to identify a deletion attribute. As exemplarily shown in FIG. 10(1), these additional attribute options may be displayed along with the marker 29a. Alternatively, although the marker 29a includes such an additional attribute option, the digital image processing apparatus 100 may not display the additional attribute option. For example, although the digital image processing apparatus 100 displays only the marker 29a expressed by β (beta) without display of any additional attribute option, when the user draws "E" along with the marker 29a expressed by β (beta), the digital image processing apparatus 100 may sense "E" as a marker having an edit attribute.

With reference to FIG. 10(2), the digital image processing apparatus 100 that executes an edit mode is shown. In one embodiment, the digital image processing apparatus 100 may execute an edit mode upon sensing an edit sign expressed by "E" along with a marker 19a displayed on the physical object.

The digital image processing apparatus 100 may receive text from the user using various methods. In one embodiment, the digital image processing apparatus 100 may display an edit window 61 and an input window 63 below the selected complete information 27. The digital image processing apparatus 100 may receive text by sensing the user's eyes located on the displayed input window 63 and display the text in the edit window 61. In another embodiment, the digital image processing apparatus 100 may display a virtual keyboard 9 in an external space. The digital image processing apparatus 100 may receive text by sensing the user's hand or the like located on the virtual keyboard 9 and display the text in the edit window 61. In a further embodiment, the digital image processing apparatus 100 may receive user voice via the audio unit and display text acquired via voice processing in the edit window 61.

After completion of editing, the digital image processing apparatus 100 may transmit only the selected complete information to the server. The digital image processing apparatus 100 may store edited content related to the selected complete information in the storage unit. Alternatively, the digital image processing apparatus 100 may transmit the edited content, as additional information, along with the selected complete information to the server. The digital image processing apparatus 100 may further store the edited content in the storage unit.

FIG. 11 is a view explaining a marker having a deletion attribute according to one embodiment.

With reference to FIG. 11(1), a marker having a deletion attribute is shown. The digital image processing apparatus 100 may output complete information by sensing partial information drawn on a physical object 7 and select one complete information by user selection. The marker may be produced in the digital image processing apparatus 100 or may be preset by the user. As described above with reference to FIG. 9, the digital image processing apparatus 100 may produce or display a marker rather than the previously used marker 65a, i.e. a marker expressed by α (alpha). However, when the user hand-draws the previously used marker 65a rather than the displayed marker, the digital image processing apparatus 100 may sense the previously used hand-drawn marker 65a and transmit selected complete information 28 to the server 200. This is because it is unnecessary to prevent the user from using the marker 65a although the reason why the digital image processing apparatus 100 excludes the previously used marker 65a is to prevent information duplication. In addition, as in the embodiment of FIG. 11, it is often necessary to use the previously used marker 65a. The digital image processing apparatus 100 merely excludes the previously used marker 65a and does not delete the previously used marker 65a.

The digital image processing apparatus 100 may sense a marker 19b drawn on the physical object 7 and an option (e.g., "D") to identify a deletion attribute. The option to identify a deletion attribute may be referred to as a delete sign. The digital image processing apparatus 100 may transmit a command for deletion of the selected complete information while transmitting the selected complete information 28 and the sensed marker to the server 200.

With reference to FIG. 11(2), the server 200 from which selected complete information is deleted is shown. The server 200 may receive the selected complete information 28, the linked marker 29b and the deletion command expressed by the delete sign from the digital image processing apparatus 100. The server 200 searches for stored information matching the selected complete information 28 and the linked marker 29b. When the stored matching information is retrieved, the server 200 may delete the retrieved information. When the server 200 deletes the stored information, the server 200 may transmit a deletion completion message to the digital image processing apparatus 100.

The digital image processing apparatus 100 may output a message 35 to confirm whether or not the selected complete information is deleted upon receiving the deletion completion message from the server 200. The marker expressed by α (alpha) on the digital image processing apparatus 100 becomes an unused marker as the selected complete information is deleted. Thus, the digital image processing apparatus 100 may again add the marker expressed by α (alpha) to the marker 65b to be displayed. Thereafter, the digital image processing apparatus 100 may display the marker expressed by α (alpha) for transmission.

Hereinafter, a procedure of transmitting information to the server and again receiving information from the server by the digital image processing apparatus will be described.

FIG. 12 is a timing chart of a digital image processing system according to one embodiment.

With reference to FIG. 12, a digital image transmitting apparatus 100a may sense hand-drawn information (S1210). The hand-drawn information may be partial information corresponding to a part of information.

The digital image transmitting apparatus 100a may display one or more complete information including the sensed information, the sensed information being partial information (S1215). There may exist one complete information, or no complete information. In some cases, the sensed information may fully match stored information. The digital image transmitting apparatus 100a may select one complete information by user selection.

When the complete information is selected, the digital image transmitting apparatus 100a may display the selected complete information (S1220). The digital image transmitting apparatus 100a may sense a marker hand-drawn on a physical object by the user (S1225). The marker may be randomly produced by the digital image transmitting apparatus 100a. The marker may be preset by the user.

Upon judging that the sensed marker is a sharing attribute marker, the digital image transmitting apparatus 100a may transmit the sensed sharing attribute marker along with the selected complete information to the server 200 (S1230). The server 200 may store the transmitted complete information and the transmitted marker (S1235).

A digital image receiving apparatus 100b may sense hand-drawn information and a hand-drawn marker together (S1240). The hand-drawn information and the hand-drawn marker may be drawn on a physical object for data transmission from the digital image transmitting apparatus 100a to the server. The digital image receiving apparatus 100b may transmit the sensed hand-drawn information and the sensed hand-drawn marker to the server and ask for matching information (S1245).

The server 200 may search for stored information based on the received hand-drawn information and the received hand-drawn marker (S1250). Once complete information including the received information and the received marker is retrieved, the server 200 may transmit the retrieved complete information to the digital image receiving apparatus 100b (S1255).

The digital image receiving apparatus 100b may display the received complete information (S1260).

Hereinafter, the flowchart of a control method of a digital image processing apparatus will be described.

FIG. 13 is a flow chart of a control method of a digital image processing apparatus according to one embodiment.

With reference to FIG. 13, the digital image processing apparatus may sense hand-drawn information and may search for and display one or more complete information including the sensed information, the sensed information being partial information (S1310). The sensed information may be information corresponding to a part of retrieved information, and may be the retrieved information itself. The complete information may be personal information. For example, the personal information may include an account number, a phone number, a credit card number, a password, a postal address, an e-mail address, a memo or the like.

The digital image processing apparatus may select one of the one or more complete information among the retrieved information and display the selected complete information (S1320). The digital image processing apparatus may select one complete information by user selection. In one embodiment, the digital image processing apparatus may display one of pre-stored markers, and may produce and display a marker using a marker producing algorithm. The marker may be randomly produced. Alternatively, the marker may be produced and set by the user. The marker may include symbols, figures, characters, numbers or the like.

The digital image processing apparatus may sense a hand-drawn marker and, when the sensed marker is a sharing attribute marker, transmit the sharing attribute marker along with the selected complete information (S1330). The marker may have a server transmission attribute.

As is apparent from the above-described embodiments, through a digital image processing apparatus and system and a control method thereof, it is possible to sense hand-drawn partial information and search for stored complete information including the sensed partial information.

In addition, through the digital image processing apparatus and system and the control method thereof, it is possible to share the retrieved complete information.

In addition, through the digital image processing apparatus and system and the control method thereof, it is possible to display matching complete information upon sensing hand-drawn partial information and a hand-drawn marker having a sharing attribute.

The digital image processing apparatus and system and the control method thereof according to the present specification should not be limited to configurations and methods of the above embodiments and all or some of the respective embodiments may be selectively combined to achieve various modifications.

Meanwhile, the digital image processing apparatus and system and the control method thereof according to the present specification may be implemented as software in a recording medium that can be read by a processor provided in the digital image processing apparatus. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over computer systems connected to a network so that processor readable code is stored therein and executed therefrom in a decentralized manner.

Although the exemplary embodiments have been illustrated and described as above, of course, it will be apparent to those skilled in the art that the present specification is not limited to the above described particular embodiments, and various modifications and variations can be made in the present specification without departing from the spirit or scope of the present specification, and the modifications and variations should not be understood individually from the viewpoint or scope of the present specification.

What is claimed is:

1. A digital image processing apparatus comprising:
   an image sensor unit configured to sense hand-drawn information;
   a display unit configured to display one or more complete information including the sensed hand-drawn information, the sensed hand-drawn information being partial information;
   a communication unit configured to transmit selected complete information among the one or more complete information to a server; and
   a controller,
   wherein the controller controls the display unit so as to search for and display the one or more complete information including the sensed hand-drawn information, and controls the display unit so as to display the selected complete information when one of the retrieved one or more complete information is selected, and
   wherein the controller senses a hand-drawn marker and, when the sensed hand-drawn marker is a sharing attribute marker, links the sharing attribute marker with the selected complete information and controls the communication unit so as to transmit the selected complete information along with the sharing attribute marker.

2. The apparatus according to claim 1, wherein the controller controls the display unit so as to display the sharing attribute marker along with the selected complete information, and links the sharing attribute marker with the selected complete information upon sensing a hand-drawn marker drawn along the displayed sharing attribute marker.

3. The apparatus according to claim 2, wherein the sharing attribute marker is randomly produced.

4. The apparatus according to claim 2, wherein the controller excludes the sharing attribute marker transmitted along with the selected complete information from a group of sharking attribute markers to be displayed.

5. The apparatus according to claim 4, wherein the controller adds the excluded sharing attribute marker to the group of sharing attribute markers to be displayed after a predetermined time has passed.

6. The apparatus according to claim 4, wherein, when the transmitted complete information is deleted from the server, the communication unit receives a message indicating deletion of the complete information from the server, and wherein the controller adds the excluded sharing attribute marker to the group of sharing attribute markers to be displayed.

7. The apparatus according to claim 1, wherein the selected complete information includes at least one of an account number, a phone number, a credit card number, a password, a postal address, an e-mail address and a memo.

8. The apparatus according to claim 1, wherein the selected complete information is linked with the sharing attribute marker and transmitted to the server, thus having a sharing attribute.

9. The apparatus according to claim 1, further comprising a storage unit configured to store information,
wherein the controller searches for the stored information based on the sensed information, and controls display of the one or more complete information including the sensed information among the stored information.

10. The apparatus according to claim 1, wherein the sharing attribute marker is a marker set by a user.

11. The apparatus according to claim 1, wherein the marker includes at least one a symbol, a figure, a character and a number.

12. The apparatus according to claim 1, wherein the controller divides the selected complete information into an area of the sensed information and a remaining automatically completed area.

13. The apparatus according to claim 1, wherein the controller controls reception and display of complete information including the hand-drawn information and the hand-drawn marker from the server upon sensing the hand-drawn information and the hand-drawn marker together via the image sensor unit.

14. The apparatus according to claim 1, wherein the controller further transmits additional information related to the selected complete information.

15. The apparatus according to claim 14, wherein the controller executes an edit mode when a predetermined edit sign is included in the hand-drawn marker, and controls transmission of the selected complete information to the server upon completion of editing related to the selected complete information, or transmission of the additional information along with the selected complete information to the server.

16. The apparatus according to claim 15, wherein the editing related to the selected complete information is performed to include at least one of a virtual keyboard input and a voice input.

17. The apparatus according to claim 1, wherein the controller controls transmission of a command for deletion of the selected complete information to the server when a predetermined delete sign is included in the hand-drawn marker.

18. The apparatus according to claim 17, wherein the controller controls output of a message to confirm whether or not the selected complete information is deleted.

19. A digital image transmitting/receiving system comprising a digital image transmitting apparatus, a digital image receiving apparatus and a server,
wherein the digital image transmitting apparatus senses hand-drawn information, displays one or more complete information including the sensed hand-drawn information, the sensed hand-drawn information being partial information, displays selected complete information when one of the one or more complete information is selected, senses a hand-drawn marker, and when the sensed hand-drawn marker is a sharing attribute marker, links the sharing attribute marker with the selected complete information and transmits the selected complete information along with the sharing attribute marker,
wherein the server receives and stores the selected complete information and the linked sharing attribute marker, and transmits complete information including the received marker and the received information upon receiving the hand-drawn information along with the hand-drawn marker from the digital image receiving apparatus, and
wherein the digital image receiving apparatus requests the server for information upon sensing the hand-drawn information and the hand-drawn marker together via an image sensor unit, and receives and displays complete information including the hand-drawn information and the hand-drawn marker from the server.

20. A control method of a digital image processing apparatus, the method comprising:
sensing hand-drawn information and searching for and displaying one or more complete information including the sensed hand-drawn information, the sensed hand-drawn information being partial information;
displaying selected complete information when one of the retrieved one or more complete information is selected; and
sensing a hand-drawn marker and, when the sensed hand-drawn marker is a sharing attribute marker, linking the sharing attribute marker with the selected complete information and transmitting the selected complete information along with the sharing attribute marker.

* * * * *